US012789372B2

(12) United States Patent
Park et al.

(10) Patent No.: US 12,789,372 B2
(45) Date of Patent: Nov. 10, 2026

(54) SYSTEM AND METHOD FOR PREDICTING FAILURE OF ARTICULATED ROBOT

(71) Applicant: Yuilrobotics, co. Ltd., Incheon (KR)

(72) Inventors: Min Guk Park, Incheon (KR); Eun Ju Jung, Incheon (KR)

(73) Assignee: Yuilrobotics, co. Ltd., Incheon (KR)

( * ) Notice: Subject to any disclaimer, the term of this patent is extended or adjusted under 35 U.S.C. 154(b) by 0 days.

(21) Appl. No.: 19/186,651

(22) Filed: Apr. 23, 2025

(65) Prior Publication Data

US 2025/0332722 A1 Oct. 30, 2025

(30) Foreign Application Priority Data

Apr. 24, 2024 (KR) ........................ 10-2024-0054959

(51) Int. Cl.
*B25J 9/16* (2006.01)

(52) U.S. Cl.
CPC ............. *B25J 9/1653* (2013.01); *B25J 9/163* (2013.01)

(58) Field of Classification Search
CPC ........ B25J 9/1653; B25J 9/163; B25J 9/1674; G05B 2219/37209; G05B 2219/37351; G05B 2219/37435; G05B 2219/42328
See application file for complete search history.

(56) References Cited

U.S. PATENT DOCUMENTS

| | | | | |
|---|---|---|---|---|
| 9,321,177 | B2 | 4/2016 | Ikeda et al. | |
| 2025/0332722 | A1* | 10/2025 | Park | B25J 9/1653 |
| 2025/0332727 | A1* | 10/2025 | Yoon | B25J 13/087 |
| 2026/0123620 | A1* | 5/2026 | Reyntjens | A01M 3/007 |

FOREIGN PATENT DOCUMENTS

| | | | |
|---|---|---|---|
| JP | 4575827 | B2 | 11/2010 |
| JP | 2012-61535 | A | 3/2012 |
| JP | 2021-2398 | A | 1/2021 |
| KR | 10-2021-0112105 | A | 9/2021 |

OTHER PUBLICATIONS

Korean Office Action mailed on Feb. 20, 2025 from the Korean Patent Office for Application No. 10-2024-0054959.
Korean Notice of Allowance mailed on Apr. 14, 2025 from the Korean Patent Office for Application No. 10-2024-0054959.

* cited by examiner

*Primary Examiner* — Bhavesh V Amin

(57) ABSTRACT

According to one embodiment of the proposed invention, individual vibration values for each part of an articulated robot are measured, individual current values of respective motors are measured, correlations between a plurality of pieces of unit position pattern information, vibration value data, and current value data is analyzed, and a failure or possibility of failure for each part of an articulated robot is predicted.

8 Claims, 5 Drawing Sheets

1000

SYSTEM AND METHOD FOR PREDICTING FAILURE OF ARTICULATED ROBOT

CROSS-REFERENCE TO RELATED APPLICATION(S)

This application claims priority from Korean Patent Application No. 10-2024-0054959, filed on Apr. 24, 2024, in the Korean Intellectual Property Office, the disclosures of which are incorporated herein by reference in its entirety.

BACKGROUND

1. Field

The following description relates to a technology for predicting a failure of an articulated robot.

2. Description of Related Art

As smart factories are being spread more actively, the use of industrial articulated robots is increasing. Articulated robots include a plurality of motors and drive the respective motors sequentially or simultaneously in time series to perform a certain pattern of motion, and contribute to mass production of products through precise repetitive motions.

However, the performance of an articulated robot may be degraded due to aging, changes in the surrounding environment, etc., and certain motions cannot be performed. In this case, it is required to accurately predict whether the articulated robot has failed or is likely to fail, and furthermore, it is required to predict a failure or possibility of failure for each part of the articulated robot to improve the ease of repair.

In Japanese Laid-open Patent Application (Publication No. 2012-61535, "METHOD OF DETERMINING ABNORMALITY OF REDUCER, ABNORMALITY DETERMINATION DEVICE, ROBOT, AND ROBOT SYSTEM"), a technology for determining an abnormality of a reducer using an extracted vibration component of the reducer is disclosed, but a technology for predicting a failure for each part of an articulated robot by measuring a current value of a motor is not disclosed.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a technology for accurately and reliably predicting a failure or possibility of failure for each part of an articulated robot.

The following description also relates to a technology for rapidly and accurately predicting a failure or possibility of failure for each part of an articulated robot.

In one general aspect, individual vibration values for each part of an articulated robot are measured, individual current values output by each of motors are measured, correlations between a plurality of pieces of unit position pattern information, vibration value data, and current value data is analyzed, and a failure of the articulated robot is predicted.

In another general aspect, a correlation between a plurality of pieces of unit position pattern information, vibration value data, and current value data is learned as a data set, and a failure of the articulated robot is predicted based on the learned data.

Figure 1:
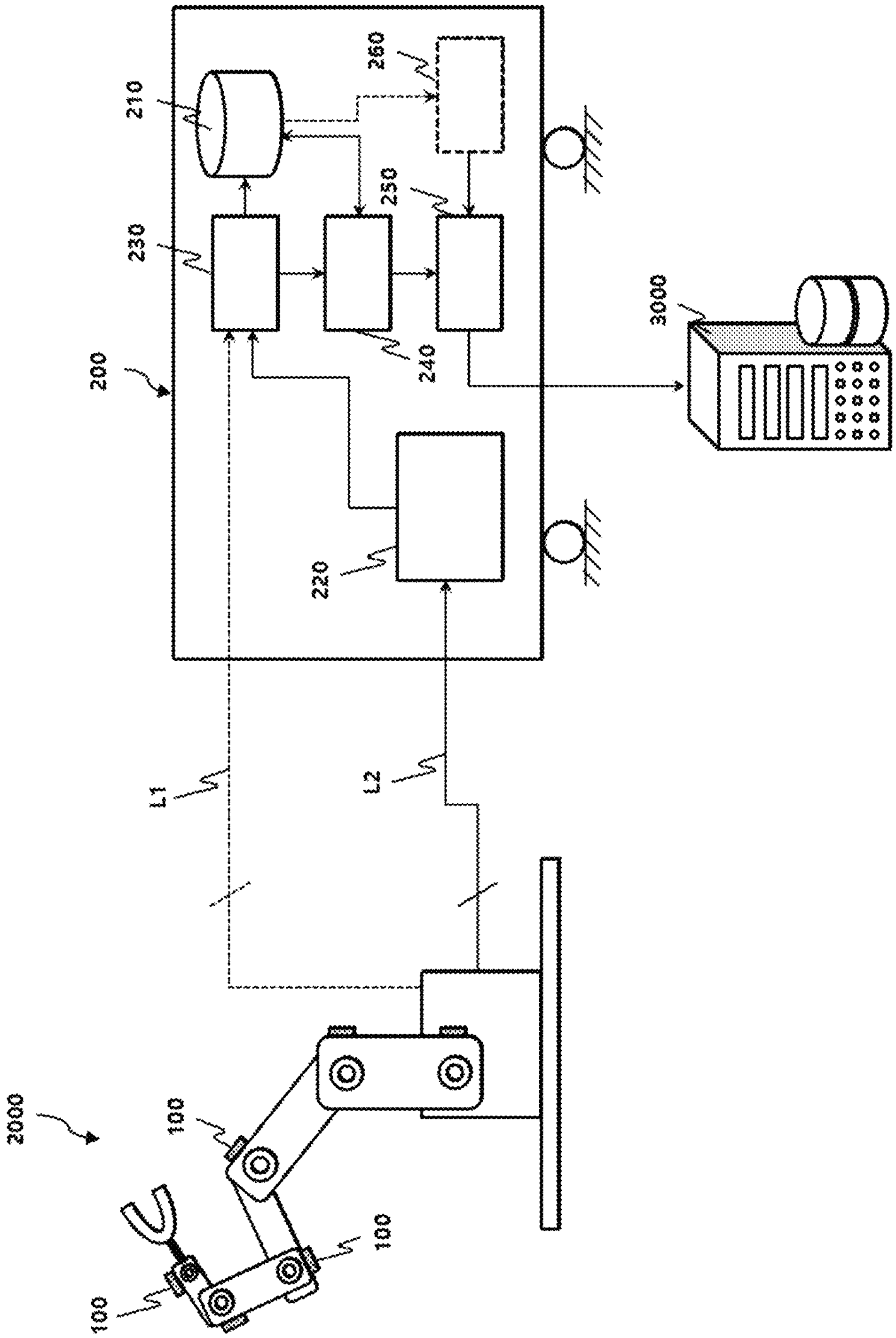
FIG. 1 is a diagram illustrating a configuration of a system for predicting a failure of an articulated robot according to one embodiment.

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above-described and additional aspects are embodied through embodiments described with reference to the accompanying drawings. It should be understood that various combinations of elements of each embodiment are possible within embodiments or with elements of other embodiments unless otherwise stated or in the case of contradiction. Terms used in this specification and the claims should be interpreted with meanings and concepts which are consistent with the technological scope of the present invention based on the principle that the inventors have appropriately defined concepts of terms in order to describe the present invention in the best way. Hereinafter, exemplary embodiments of the present invention will be described in detail with reference to the accompanying drawings.

FIG. 1 is a diagram illustrating a configuration of a system for predicting a failure of an articulated robot according to one embodiment. As illustrated in the drawing, a system 1000 for predicting a failure of an articulated robot includes a vibration measurement circuit 100 and a driving circuit 200. FIG. 1 further illustrates an articulated robot 2000 and a server 3000, but these components may not be included in the system 1000 for predicting the failure of the articulated robot of the present invention.

The driving circuit 200 includes components such as a pattern storage circuit 210, a current measurement circuit 220, a data collection circuit 230, a correlation analysis circuit 240, and a failure prediction circuit 250. The driving circuit 200 may further include a power supply circuit and a control circuit (not illustrated) to drive each of the above components and drive an operation of the articulated robot 2000. The driving circuit 200 may be equipped with wheels and may be moved.

According to one embodiment of the proposed invention, individual vibration values for each part of an articulated robot are measured, individual current values output by each of motors are measured, a correlation between a plurality of pieces of unit position pattern information, vibration value data, and current value data is analyzed, and a failure of the articulated robot is predicted.

According to one embodiment, the system 1000 for predicting the failure of the articulated robot of which each of a plurality of joints is equipped with a motor and which is continuously operatable along a plurality of unit position patterns includes a plurality of vibration measurement circuits 100 that are provided on the articulated robot and measure individual vibration values for each part of the articulated robot, and a driving circuit 200 that drives an operation of the articulated robot.

The driving circuit 200 may include a pattern storage circuit 210 in which the plurality of pieces of unit position pattern information are stored, a current measurement circuit 220 that measures the individual current values of the respective motors, a data collection circuit 230 that collects the vibration value data and the current value data from the vibration measurement circuits and the current measurement circuit, a correlation analysis circuit 240 that analyzes correlations between the unit position pattern information, the vibration value data, and the current value data of the articulated robot, and a failure prediction circuit 250 that predict a failure of the articulated robot by determining whether the vibration value and the current value exceed predetermined thresholds for each unit position pattern.

The vibration measurement circuits 100 may be provided on the articulated robot, measure the individual vibration values for each part of the articulated robot, and output the vibration value data. The articulated robot 2000 may be a six-joint robot, but the present invention is not limited thereto, and the articulated robot 2000 may be equipped with a plurality of motors (e.g., servo motors and step motors). The articulated robot 2000 may be provided as a plurality of articulated robots 2000, and each of the plurality of articulated robots 2000 may be electrically connected to the driving circuit 200. The plurality of articulated robots may operate the same unit position pattern, or alternatively, may operate different unit position patterns during the same time period. The plurality of vibration measurement circuits 100 may be attached onto the articulated robot 2000. The vibration measurement circuit 100 may be configured as a vibration sensor. The vibration measurement circuits 100 may be electrically connected to the driving circuit 200 via a first cable L1.

The pattern storage circuit 210 may store the unit position pattern information of the articulated robot 2000. The "unit position pattern information" may mean continuous trajectory motion information from a stationary position to a next stationary position.

Figure 2:
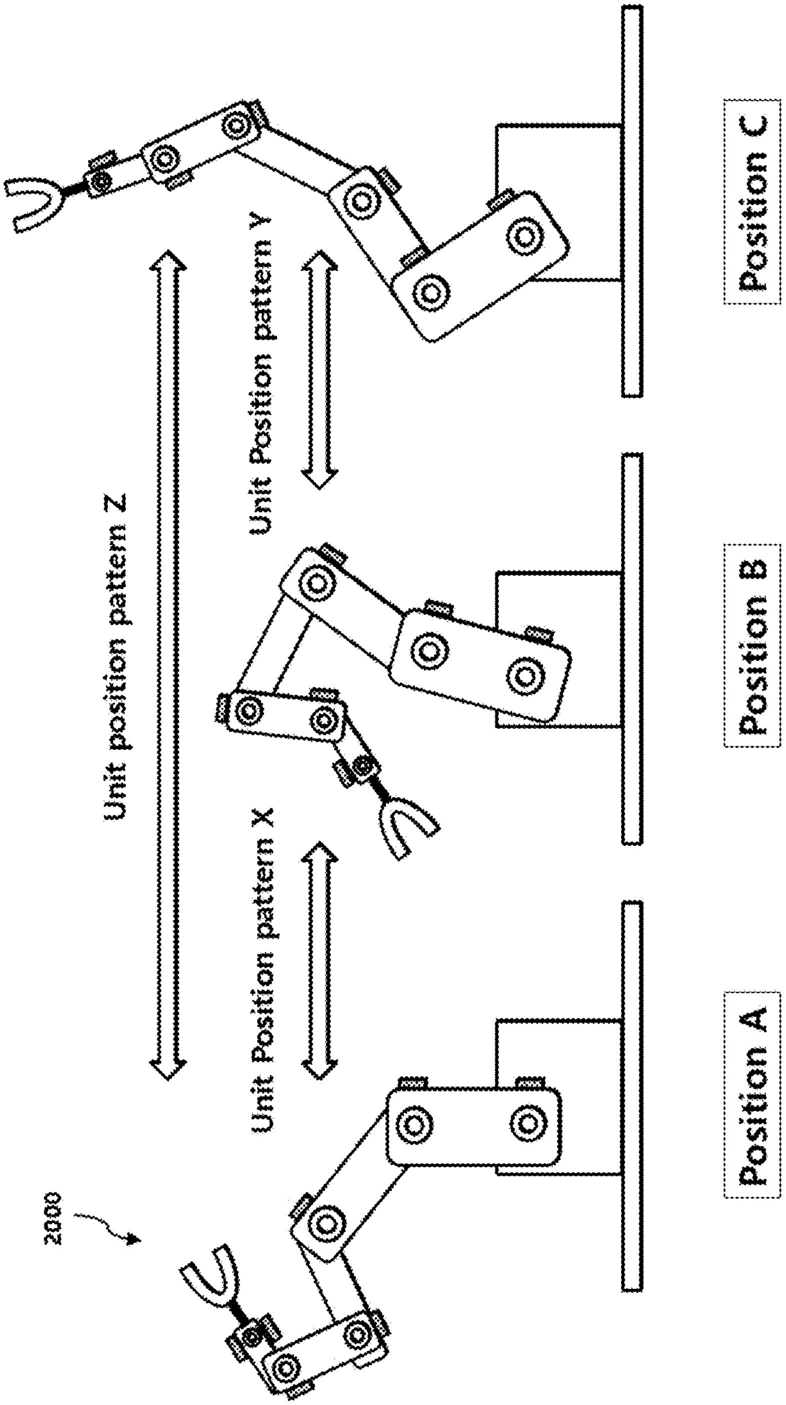
FIG. 2 is a diagram illustrating an articulated robot operating in unit position patterns according to one embodiment.

FIG. 2 is a diagram illustrating an articulated robot operating in unit position patterns according to one embodiment. As illustrated in the drawing, the articulated robot 2000 may express three stationary positions: Position A, Position B, and Position C. Further, the articulated robot 2000 may express "Unit Position pattern X (first unit position pattern)" defining a continuous trajectory motion between Position A and Position B. Further, the articulated robot 2000 may express "Unit Position pattern Y (second unit position pattern)" defining a continuous trajectory motion between Position B and Position C. Further, the articulated robot 2000 may express "Unit Position pattern Z (third unit position pattern)" defining a continuous trajectory motion between Position A and Position C. In this way, the articulated robot 2000 may express a continuous motion from a stationary position to a next stationary position, that is, "unit position pattern," by driving the plurality of motors in combination. The unit position pattern information may be pre-stored in the pattern storage circuit 210. The present invention may separately store and analyze the first unit position pattern (A→B movement) from the second unit position pattern (B→C movement).

The current measurement circuit 220 may measure the individual current values of the respective motors and output the current value data. The current measurement circuit 220 may be electrically connected to the driving circuit 200 via a second cable L2.

Figure 3:
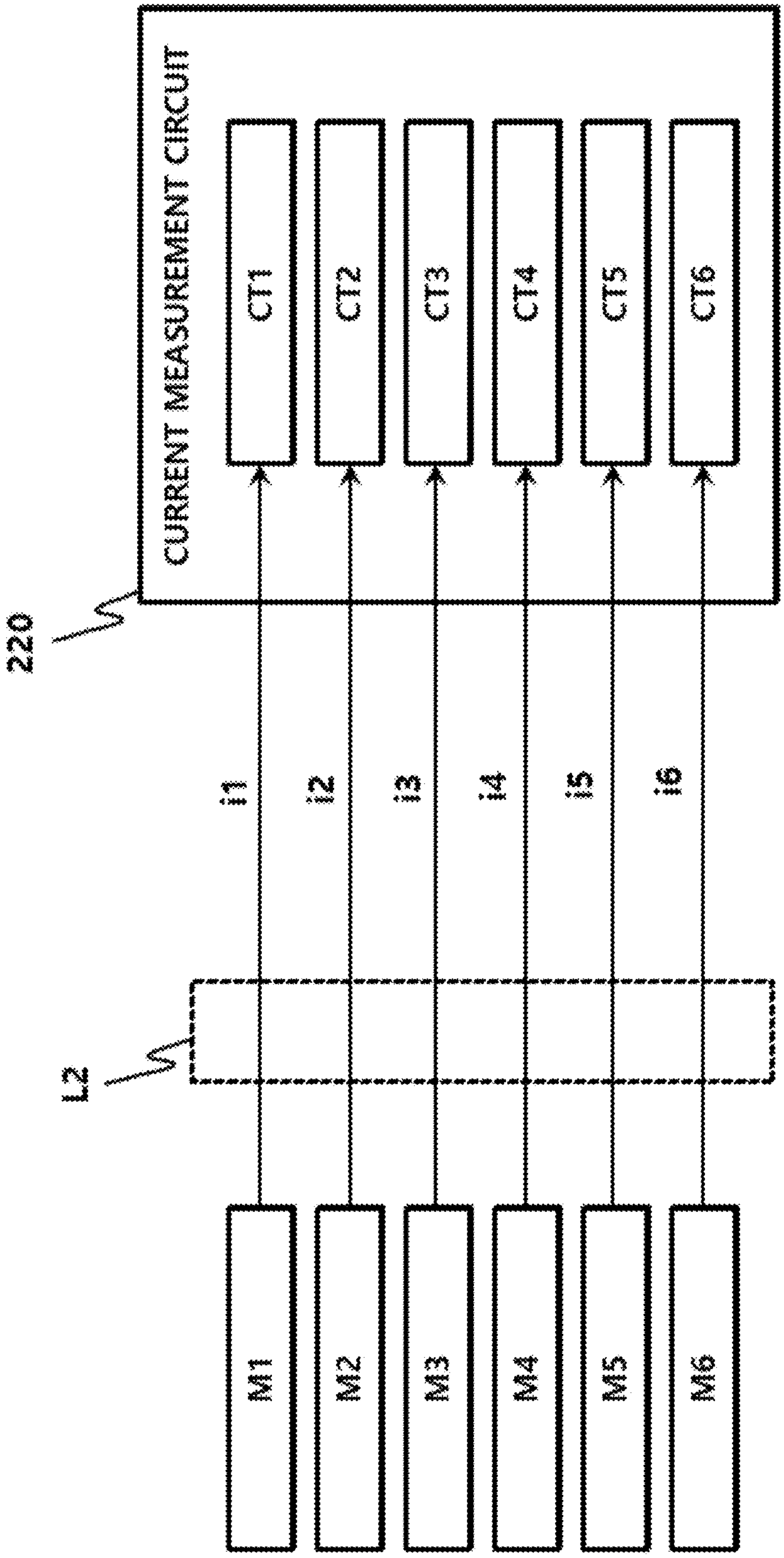
FIG. 3 is a diagram illustrating a current measurement unit that measures individual current values of each of a plurality of motors according to one embodiment.

FIG. 3 is a diagram illustrating a current measurement circuit that measures individual current values of each of a plurality of motors according to one embodiment.

As illustrated in the drawing, the current measurement circuit 220 may measure individual current values i1, i2, i3, i4, i5, and i6 of each of a plurality of motors M1, M2, M3, M4, M5, and M6 provided in the articulated robot 2000. The current measurement circuit 220 may include a plurality of current transformers (CTs), and the plurality of CTs CT1, CT2, CT3, CT4, CT5, and CT6 may be electrically connected to the plurality of motors M1, M2, M3, M4, M5, and M6, respectively, to measure the current values of the motors. The number of plurality of CTs does not need to be the same as the number is of plurality of motors. The plurality of CTs may be provided on the cable L2. The driving circuit 200 may supply alternating current (AC) or direct current (DC) to the plurality of motors M1, M2, M3, M4, M5, and M6.

The data collection circuit 230 may collect vibration value data and current value data from the vibration measurement circuit and the current measurement circuit. The vibration value data and the current value data may exhibit different time-series characteristics for each unit position pattern. For example, Unit Position pattern Y may exhibit greater vibration and current values than Unit Position pattern X does.

The correlation analysis circuit 240 may analyze correlations between the unit position pattern information, the vibration value data, and the current value data of the articulated robot. The correlation analysis circuit 240 may analyze a relationship between time-series vibration value data and time-series current value data related to a specific unit position pattern.

According to one embodiment, the correlation may mean a correlation degree. A sliding window technique may be applied to the correlation analysis. The sliding window technique may mean a method of determining how a correlation between a plurality of time-series variables changes over time. For example, the correlation analysis circuit 240 may calculate a correlation between data within a window after passing selected data through a window of 60 minutes, and sequentially calculate a correlation degree by moving the window at one-minute intervals.

The failure prediction circuit 250 may predict a failure of the articulated robot 2000 by determining whether the vibration value and the current value exceed predetermined thresholds for each unit position pattern of the articulated robot. When the failure prediction circuit 250 detects abnormal data exceeding the predetermined thresholds, the failure prediction circuit 250 may notify the server 3000 of the fact that the abnormal data is detected, and furthermore, may notify the server 3000 of the motor or surroundings of the motor in which the abnormal data has occurred. For example, when the current intensity of the motor M2 in Unit Position pattern X significantly increases compared to past data, the failure prediction circuit 250 may generate a failure prediction signal to generate an alarm signal or notify the server 3000 of a failure prediction. According to one embodiment, the failure prediction circuit 250 may be an artificial intelligence (AI) engine. The failure prediction circuit 250 may generate optimal failure prediction data using an AI algorithm such as a recurrent neural network (RNN), a convolutional neural network (CNN), a multi-layer perceptron (MLP), a random forest, etc.

According to an additional aspect, the unit position pattern information may be generated by capturing with a vision camera (not illustrated) and analyzing with a pattern analysis circuit 270.

The vision camera may be electrically connected to the pattern analysis circuit 270 and capture a stationary position and dynamic motion of the articulated robot 2000. The vision camera may capture a motion at each position and a motion in a section between the positions. The vision camera does not need to be in physical contact with the driving circuit 200. The vision camera may generate motion image data of the articulated robot 2000 and provide the generated motion image data to the data the pattern analysis circuit 270.

According to an additional aspect, the vibration measurement circuit 100 may measure a vibration value of at least one of a bearing and a reducer (not illustrated) provided in the articulated robot 2000. The bearing and the reducer may be disposed around the motor. The bearing and the reducer are typically susceptible to aging or wear.

According to an additional aspect, the vibration value may include at least one of the intensity and frequency of a vibration, and the current value may include at least one of the intensity and frequency of a current. The articulated robot 2000 may be driven by an AC power supply or a DC power supply.

According to an additional aspect, the system 1000 for predicting the failure of the articulated robot may further include a learning circuit 260 that learns correlations between unit position pattern information, vibration value data, and current value data as a data set and provides learned data to the failure prediction circuit. The data set may be composed of big data.

Figure 4:
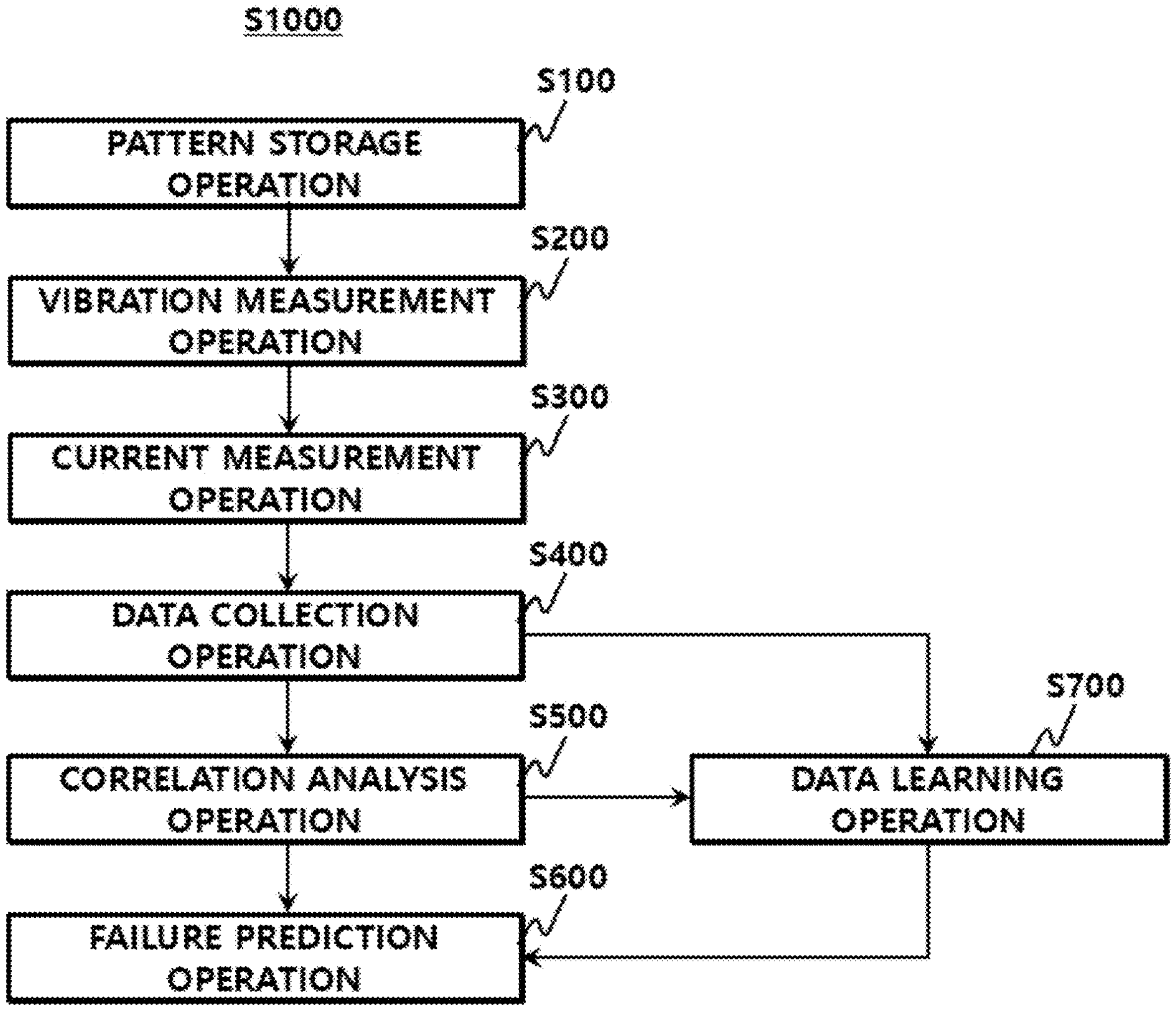
FIG. 4 is a flowchart illustrating a method of predicting a failure of an articulated robot according to one embodiment.

FIG. 4 is a flowchart illustrating a method of predicting a failure of an articulated robot according to one embodiment. A method S1000 for predicting a failure of an articulated robot of which each of a plurality of joints is equipped with a motor and which is continuously operatable along a plurality of unit position patterns may include a pattern storage operation S100 of storing a plurality of pieces of unit position pattern information, a vibration measurement operation S200 of measuring individual vibration values for each part of the articulated robot, a current measurement operation S300 of measuring individual current values of respective motors, a data collection operation S400 of collecting vibration value data and current value data, a correlation analysis operation S500 of analyzing correlations between the plurality of pieces of unit position pattern information, the vibration value data, and the current value data, and a failure prediction operation S600 of predicting a failure of the articulated robot by determining whether the vibration value and the current value exceed predetermined thresholds on the basis of the unit position pattern information.

In the pattern storage operation S100, the plurality of pieces of unit position pattern information may be stored. The "unit position pattern information" may mean continuous motion information from a stationary position to a next stationary position. The "unit position pattern information" may refer to the description of that in FIG. 2. In the vibration measurement operation S200, the individual vibration values for each part of the articulated robot may be measured. In the current measurement operation S300, the individual current values of the respective motors may be measured. The current measurement method may refer to the description of that of FIG. 3.

According to an additional aspect, in the vibration measurement operation S200, a vibration value of at least one of a bearing and a reducer provided in the articulated robot may be measured. The bearing and the reducer may be disposed around the motor. The bearing and the reducer are typically susceptible to aging or wear.

According to an additional aspect, the vibration value may include at least one of the intensity and frequency of a vibration, and the current value may include at least one of the intensity and frequency of a current. The articulated robot may be driven by an AC power supply or a DC power supply.

According to an additional aspect, the method S1000 for predicting the failure of the articulated robot may further include a data learning operation S700 of learning correlations between unit position pattern information, vibration value data, and current value data as a data set and generating learned data. The data set may be composed of big data.

Figure 5:
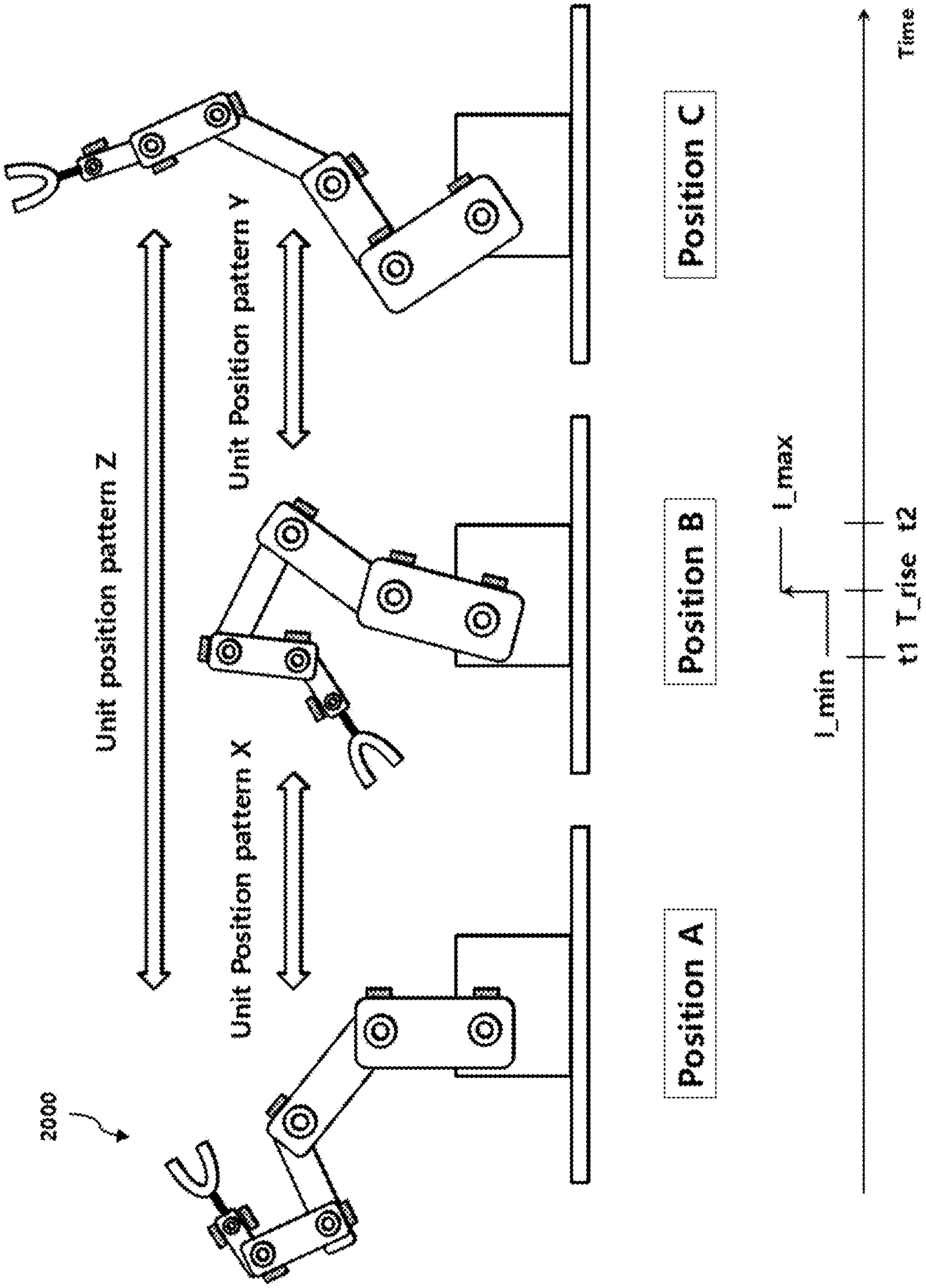
FIG. 5 is a diagram illustrating an aspect of measuring individual current values output by each of motors at a boundary time point between different unit position patterns of an articulated robot according to one embodiment.

FIG. 5 is a diagram illustrating an aspect of measuring individual current values output by each of motors at a boundary time point between different unit position patterns of an articulated robot according to one embodiment. According to an additional aspect, the current measurement circuit 220 of FIG. 1 may measure the individual current values output by each of the motors at the boundary time point between different circuit position patterns of the articulated robot. For example, the current measurement circuit 220 may measure the individual current values output by each of the motors at the boundary time point between Unit Position pattern X (first unit position pattern) and Unit Position pattern Y (second unit position pattern). In this way, by measuring a state of a sudden change in the motor load at the boundary time point, that is, at an (instantaneous) point (t2−t1) when moving from Unit Position pattern Y (the second unit position pattern), and by analyzing whether the motor is abnormal, a failure of the articulated robot may be predicted. The boundary time point, that is, Position B, is a time point or position when a static friction force is applied, and is a time point or position when the motor load is relatively large. The boundary time point may mean an instantaneous point (t2−t1).

When the robot in a normal state transitions from Unit Position pattern X to Unit Position pattern Y, a specific waveform for the current value of each motor may be calculated. Important characteristics may be extracted from this waveform. A normal range of each characteristic value, such as a minimum current value (I_min), a maximum current value (I_max), a current rise time (T_rise), a stabilization time (T_stable), and/or a current change rate (dl/dt), may be set, and real-time measurement values may be monitored to determine whether the real-time measurement values are out of this range.

For example, the motor M2 normally has an I_max of 3.2 A and a T_rise of 150 ms when transitioning patterns, but when I_max is measured to be 3.8 A and T_rise as 210 ms, it may be determined as a sign of failure in the corresponding motor part.

According to the proposed invention, a failure for each part of an articulated robot can be accurately and reliably predicted for each part.

Further, a failure for each part of an articulated robot can be rapidly and accurately predicted, and repair can be made easy.

Effects of the present invention are not limited to the above-described effects and other effects that are not described may be clearly understood by those skilled in the art from this specification and the accompanying drawings.

While embodiments of the present invention have been described with reference to the accompanying drawings, the present invention is not limited to the embodiments. It should be interpreted that various modifications that can be apparently made by those skilled in the art are included in the scope of the present invention. The appended claims are intended to cover such modified embodiments.

What is claimed is:

1. A system for predicting a failure of an articulated robot of which each of a plurality of joints is equipped with a motor and which is continuously operatable along a plurality of unit position patterns, the system comprising:

a plurality of vibration measurement circuits that are provided on the articulated robot and measure individual vibration values for each part of the articulated robot; and a driving circuit configured to drive an operation of the articulated robot, wherein the driving circuit includes:

a pattern storage circuit in which unit position pattern information of the articulated robot is stored;

a current measurement circuit that measures individual current values output by each of the motors;

a data collection circuit that collects vibration value data and current value data from the vibration measurement circuits and the current measurement circuit;

a correlation analysis circuit that analyzes correlations between the unit position pattern information, the vibration value data, and the current value data of the articulated robot; and a failure prediction circuit that predicts a failure of the articulated robot by determining whether the vibration value and the current value exceed predetermined thresholds for each unit position pattern of the articulated robot.

2. The system of claim 1, wherein the vibration measurement circuit measures a vibration value of at least one of a bearing and a reducer provided in the articulated robot.

3. The system of claim 1, wherein the vibration value includes at least one of an intensity and frequency of a vibration, and the current value includes at least one of an intensity and frequency of a current.

4. The system of claim 1, further comprising a learning circuit configured to learn the correlations between the unit position pattern information, the vibration value data, and the current value data as a data set and provide the learned data to the failure prediction circuit.

5. A method of predicting a failure of an articulated robot of which each of a plurality of joints is equipped with a motor and which is continuously operatable along a plurality of unit position patterns, the method comprising:

a pattern storage operation of storing a plurality of pieces of unit position pattern information;

a vibration measurement operation of measuring individual vibration values for each part of the articulated robot;

a current measurement operation of measuring individual current values output by each of the motors;

a data collection operation of collecting vibration value data and current value data;

a correlation analysis operation of analyzing correlations between the plurality of pieces of unit position pattern information, the vibration value data, and the current value data; and a failure prediction operation of predicting a failure of the articulated robot by determining whether the vibration value and the current value exceed predetermined thresholds on the basis of the unit position pattern information.

6. The method of claim 5, wherein, in the vibration measurement operation, a vibration value of at least one of a bearing and a reducer provided in the articulated robot is measured.

7. The method of claim 5, wherein the vibration value includes at least one of an intensity and frequency of a vibration, and the current value includes at least one of an intensity and frequency of a current.

8. The method of claim 5, further comprising a data learning operation of learning the correlations between the unit position pattern information, the vibration value data, and the current value data as a data set and generating learned data.

* * * * *